(12) United States Patent
Luo

(10) Patent No.: US 11,329,948 B2
(45) Date of Patent: May 10, 2022

(54) IPV6 STATELESS ADDRESS AUTO-CONFIGURATION

(71) Applicant: NEW H3C TECHNOLOGIES CO., LTD., Hangzhou (CN)

(72) Inventor: Lin Luo, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 163 days.

(21) Appl. No.: 16/805,616

(22) Filed: Feb. 28, 2020

(65) Prior Publication Data

US 2020/0314059 A1 Oct. 1, 2020

(30) Foreign Application Priority Data

Mar. 28, 2019 (CN) .......................... 201910241512.X
Jun. 28, 2019 (CN) .......................... 201910580274.5

(51) Int. Cl.
*H04L 61/5007* (2022.01)
*H04L 101/659* (2022.01)

(52) U.S. Cl.
CPC ...... *H04L 61/2007* (2013.01); *H04L 61/6059* (2013.01)

(58) Field of Classification Search
CPC ............. H04L 61/2007; H04L 61/6059; H04L 61/2053; H04L 61/2092; H04L 61/6022; H04L 63/0876; H04L 9/0643; H04L 9/0866; H04L 41/0803
See application file for complete search history.

(56) References Cited

U.S. PATENT DOCUMENTS

| 8,886,775 | B2 * | 11/2014 | Asati | ...................... H04L 61/103 |
| | | | | 709/220 |
| 2003/0200437 | A1 * | 10/2003 | Oishi | .................... H04L 9/3013 |
| | | | | 713/175 |
| 2004/0083306 | A1 * | 4/2004 | Gloe | ................. H04L 29/12066 |
| | | | | 709/245 |
| 2004/0240669 | A1 * | 12/2004 | Kempf | .............. H04L 29/12009 |
| | | | | 380/277 |
| 2005/0111377 | A1 * | 5/2005 | Lioy | ................. H04L 29/12273 |
| | | | | 370/252 |
| 2005/0117590 | A1 * | 6/2005 | Ronneke | ............... H04L 69/167 |
| | | | | 370/395.52 |
| 2007/0091822 | A1 * | 4/2007 | Do | ....................... H04L 41/0806 |
| | | | | 370/254 |

(Continued)

FOREIGN PATENT DOCUMENTS

| CN | 103179227 A | 6/2013 |
| EP | 2704403 A1 | 3/2014 |

OTHER PUBLICATIONS

T. Narten, Neighbor Discovery for IP version 6 (IPv6), Sep. 2007, Sun Microsystems, pp. 1-84 (Year: 2007).*

(Continued)

*Primary Examiner* — Javier O Guzman
(74) *Attorney, Agent, or Firm* — McCoy Russell LLP

(57) ABSTRACT

The present disclosure provides an IPv6 stateless address auto-configuration method, a network device and a host. The method includes: sending a router advertisement RA message to a host, wherein the RA message includes a prefix information option, and the prefix information option includes a prefix and a flag. The host performs IPv6 stateless address auto-configuration according to the prefix and the flag.

16 Claims, 5 Drawing Sheets

User host 101          Network device 102

(56) References Cited

U.S. PATENT DOCUMENTS

| | | | |
|---|---|---|---|
| 2009/0225680 A1* | 9/2009 | Cha | H04L 61/2015 370/254 |
| 2010/0097983 A1* | 4/2010 | Schuringa | H04L 61/2084 370/328 |
| 2013/0279367 A1* | 10/2013 | Sarikaya | H04L 29/06068 370/254 |
| 2014/0095733 A1* | 4/2014 | Liu | H04L 41/0806 709/245 |
| 2014/0219165 A1* | 8/2014 | Lin | H04L 61/1511 370/328 |
| 2015/0180823 A1 | 6/2015 | Zheng et al. | |
| 2020/0169871 A1* | 5/2020 | Zhu | H04W 76/20 |
| 2020/0221298 A1* | 7/2020 | Pan | H04L 63/0869 |
| 2020/0296025 A1* | 9/2020 | Wang | H04L 12/4641 |

OTHER PUBLICATIONS

Thomson, S. et al., "IPV6 Stateless Address Autoconfiguration," Internet Engineering Task Force Website, Available Online at https://www.ietf.org/rfc/rfc2462.txt, Network Working Group, Request for Comments: 4862, Obsoletes: 2462, Category: Standards Track, Sep. 2007, 23 pages.

"TCP/IP IPV6," p. 41, 2.1 Address Structure, Jul. 25, 2013, 15 pages. (See NPL 3, Japanese Office Action Issued in Application No. 2020-033994 for Explanation of Relevance).

Japanese Patent Office, Office Action Issued in Application No. 2020-033994, dated Feb. 24, 2021, 15 pages. (Submitted with Machine Translation).

European Patent Office, Office Action Issued in Application No. 20160147.3, dated Jul. 6, 2021, Germany, 5 pages.

Narten, T. et al., "Neighbor Discovery for IP version 6 (IPv6)," Internet Engineering Task Force Website, Available Online at https://tools.ietf.org/html/rfc486, Network Working Group Request for Comments: 4861, Obsoletes: 2461, Sep. 1, 2007, 97 pages.

Nartem, T. et al., "Privacy Extensions for Stateless Address Autoconfiguration in IPv6," Internet Engineering Task Force Website, Available Online at https://tools.ietf.org/html/rfc4941, Request for Comments: 4941, Obsoletes: 3041, Sep. 1, 2007, 23 pages.

Haberman, B. et al., "IPv6 Router Advertisement Flags Option," Internet Engineering Task Force Website, Available Online at https://tools.ietf.org/html/rfc5175, Request for Comments: 5175, Obsoletes: 5075, Mar. 1, 2008, 7 pages.

Troan, O., "IANA Considerations for IPv6 Neighbor Discovery Prefix Information Option Flags," Internet Engineering Task Force Website, Available Online at https://tools.ietf.org/html/rfc8425, Request for Comments: 8425, Updates: 4861, Jul. 1, 2018, 4 pages.

European Patent Office, Extended European Search Report Issued in Application No. 20160147.3, dated Apr. 30, 2020, Germany, 10 pages.

* cited by examiner

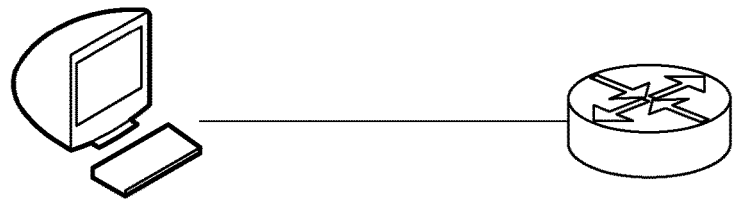

User host 101      Network device 102

Send, by a network device, an RA message to a host, wherein the RA message includes a prefix information option, the prefix information option includes a prefix and a flag configured for IPv6 stateless address auto-configuration

FIG. 2

```
+-+-+-+-++-+-+-+-+-+-+-+-+-+-+-+-+-+-+-+-+-+-+-+-+-+-+-+-+-+-+-+
|  Type  |   Length  |   Prefix Length    |L|A|R|T|Mode|Reserved1|
+-+-+-+-+-+-+-+-+-+-+-+-+-+-+-+-+-+-+-+-+-+-+-+-+-+-+-+-+-+-++-+
|                        Valid Lifetime                         |
+-+-+-+-+-+-+-+-+-+-+-+-+-+-+-+-+-+-+-+-+-+-+-+-+-+-+-+-+-+-++-+-
|                      Preferred Lifetime                       |
+-+-+-+-+-+-+-+-+-+-+-+-+-+-+-+-+-+-+-+-+-+-+-+-+-+-+-+-+-+-++-+-
|                          Reserved2                            |
+-+-+-+-+-+-+-+-+-+-+-+-+-+-+-+-+-+-+-+-+-+-+-+-+-+-+-+-+-+-++-+-
|                                                               |
+                                                               +
|                                                               |
+                           Prefix                              +
|                                                               |
+                                                               +
|                                                               |
+-+-+-+-+-+-+-+-+-+-+-+-+-+-+-+-+-+-+-+-+-+-+-+-+-+-+-+-+-+-++-+-
```

FIG. 3

IPV6 STATELESS ADDRESS AUTO-CONFIGURATION

CROSS REFERENCE TO RELATED APPLICATION

The present application claims priority to Chinese Patent Application No. 201910241512.X, entitled "IPV6 stateless address generation method and apparatus", and filed on Mar. 28, 2019. The present application also claims priority to Chinese Patent Application No. 201910580274.5, entitled "IPV6 STATELESS ADDRESS AUTO-CONFIGURAITON METHOD, NETWORK DEVICE AND HOST", and filed on Jun. 28, 2019. The entire contents of each of the above-listed applications are hereby incorporated by reference for all purposes.

BACKGROUND

An Internet Protocol Version 6 (referred to as IPv6) address includes a prefix and an interface identifier. The IPv6 address has a total length of 128 bits, and has the characteristic of huge address space. At present, IPv6 address allocation methods stipulated by existing communication protocols mainly include a stateful address allocation method and a stateless address allocation method.

In the stateful address allocation method, a special Dynamic Host Configuration Protocol (referred to as DHCP) server needs to be configured. The DHCP server allocates an IPv6 address to a host. The host obtains the allocated IPv6 address from a DHCP client configured thereon.

In the stateless address allocation method, usually, a host monitors a router advertisement message sent by a network device, for example, a gateway, to obtain a prefix carried in the router advertisement message. In addition, the host needs to generate an interface identifier of the host. Then, the host generates an IPv6 address of the host according to the prefix and the interface identifier.

BRIEF DESCRIPTION OF DRAWINGS

FIG. 1 is a schematic diagram illustrating a networking architecture to which an IPv6 stateless address auto-configuration method is applicable according to an example of the present disclosure.

FIG. 2 is a flowchart illustrating an IPv6 stateless address auto-configuration method according to an example of the present disclosure.

FIG. 3 is a schematic diagram illustrating a format of a prefix information option of an RA message according to an example of the present disclosure.

DETAILED DESCRIPTION

Figure 4:
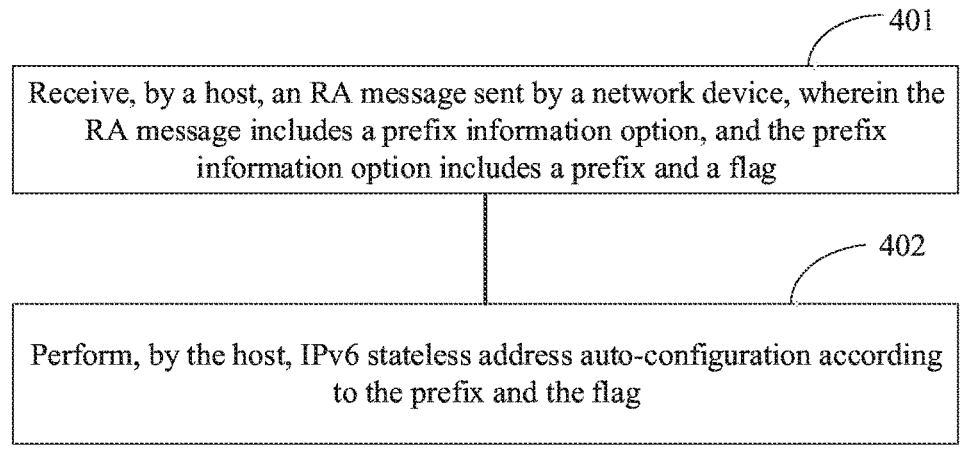
FIG. 4 is a schematic diagram illustrating another IPv6 stateless address auto-configuration method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

In an IPv6 stateless address auto-configuration method, an IPv6 address usually includes a prefix and an interface identifier. During the generation of the IPv6 address, a host needs to determine the prefix and interface identifier.

A network device may send a Router Advertisement (referred to as RA) message to the host. The RA message includes a prefix. The host generates an interface identifier in a known interface identifier generation mode. The host then uses the prefix and interface identifier to generate an IPv6 address. Because the host uses a uniform interface identifier generation mode to generate an interface identifier, the mode for the host to generate an IPv6 address according to the interface identifier and prefix lacks exchange, which makes it very inflexible for the host to perform IPv6 stateless address auto-configuration.

In view of this, this disclosure proposes a new IPv6 stateless address auto-configuration method. In one implementation, a network device, for example, a router, may periodically send an RA message to a host. A prefix information option of the RA message includes a prefix and a flag. After receiving the RA message, the host may use the prefix and flag to generate an IPv6 address of the host. In another implementation, in order to obtain a prefix, a host may also send a Router Solicitation (RS) message to a network device. After receiving the RS message sent by the host, the network device returns an RA message to the host.

Because the host performs the IPv6 stateless address auto-configuration according to the prefix and flag in the prefix information option, the mode for the host to perform the IPv6 stateless address auto-configuration is more flexible.

Referring to FIG. 1, FIG. 1 is a schematic diagram illustrating a networking architecture to which an IPv6 stateless address auto-configuration method is applicable according to an example of the present disclosure.

The networking may include a host 101 and a network device 102. The host 101 and the network device 102 may be directly connected to each other. Of course, the host 101 and the network device 102 may also be connected through other devices. The connection method of the host 101 and the network device 102 is not particularly limited herein.

In actual applications, the networking where the host 101 and the network device 102 are located may have different network types. For example, the host 101 and the network device 102 may exist in a user authentication network. Of course, the host 101 and the network device 102 may also exist in an enterprise internal network, and so on. The networking where the host 101 and the network device 102 are located is not particularly limited herein.

Referring to FIG. 2, FIG. 2 is a flowchart illustrating an IPv6 stateless address auto-configuration method according to an example of the present disclosure. The method may be applied to a network device, and include the following blocks.

At block 201, the network device sends an RA message to a host. The RA message includes a prefix information option. The prefix information option includes a prefix and a flag. The prefix and flag are used for IPv6 stateless address auto-configuration.

Where the network device may include a router, a gateway device, etc. Here, the network device is only exemplarily described, and is not particularly limited.

The prefix and flag being used for the IPv6 stateless address auto-configuration means that the prefix and flag are used by the host for the IPv6 stateless address auto-configuration.

During the implementation, the network device sends the RA message to the host. After receiving the RA message, the host may perform the IPv6 stateless address auto-configuration according to the prefix and flag carried in the prefix information option of the RA message.

This disclosure proposes a new IPv6 stateless address auto-configuration method. Since the host performs the IPv6 stateless address auto-configuration according to the prefix and flag in the prefix information option, the mode for the host to perform the IPv6 stateless address auto-configuration is more flexible.

Before introducing the block 201, the RA message is introduced in detail.

It should be noted that the RA messages described in this disclosure refer to RA messages recorded in existing IPv6 stateless address auto-configuration protocol, for example, RA messages recorded in RFC [4861], RFC [4862], etc.

An RA message includes a prefix information option. The prefix information option includes a prefix and a flag. The flag and prefix are together used to guide the host to perform the IPv6 stateless address auto-configuration.

Where the flag may be used to indicate at least an address generation mode and an IPv6 address lifetime refresh mode.

1) Address generation mode

The address generation mode is used to guide the host to generate an IPv6 address of the host according to the address generation mode and the prefix.

In an optional implementation, the address generation mode includes a host interface identifier generation mode.

The address generation mode may guide the host to generate an interface identifier according to the host interface identifier generation mode included in the address generation mode, and then generate an IPv6 address of the host according to the generated interface identifier and the prefix.

Of course, the address generation mode may also guide the host in other manners to generate the IPv6 address of the host according to the prefix and the address generation mode, which is only exemplarily described, and is not particularly limited.

2) IPv6 address lifetime refresh mode

The IPv6 address lifetime refresh mode is used to guide the host to refresh a lifetime of an IPv6 address including the prefix that has been generated by the host according to the prefix and the IPv6 address lifetime refresh mode.

Where the lifetime of the IPv6 address includes a valid lifetime and a preferred lifetime of the IPv6 address.

Refreshing the lifetime of the IPv6 address refers to extending the valid lifetime of the IPv6 address for a valid lifetime recorded in the prefix information option of the RA message and extending the preferred lifetime of the IPv6 address for a preferred lifetime recorded in the prefix information option of the RA message.

This address generation mode and IPv6 address lifetime refresh mode may be carried in the prefix information option of the RA message.

In an optional implementation, the prefix information option of the RA message further includes a Mode field and a T field. The Mode field may indicate the address generation mode, and the T field may indicate the IPv6 address lifetime refresh mode.

The Mode field and the T field are briefly introduced below.

The prefix information option of existing RA message includes a reserved field. According to an example of the present disclosure, the reserved field is extended to include the Mode field and the T field.

For example, four bits are selected in the reserved field, wherein three consecutive bits are occupied by the Mode field, and one bit is occupied by the T field.

Here, positions indicating the address generation mode and the IPv6 address lifetime refresh mode in the prefix information option are merely exemplified. Of course, the address generation mode and the IPv6 address lifetime refresh mode may also be carried in other positions of the prefix information option, which is not particularly limited herein.

Hereinafter, a format of the prefix information option of the RA message will be introduced by way of examples.

FIG. 3 is a schematic diagram illustrating a format of a prefix information option of an RA message according to an example of the present disclosure.

According to an example of the present disclosure, the prefix information option of existing RA message is extended, and a reserved (Reserved1 or Res) field 1 after an R field in the prefix information option of the existing RA message is used to extend the T field and the Mode field in the reserved field 1.

Hereinafter, the fields in the prefix information option of the RA message are described.

As shown in FIG. 3, the prefix information option of the RA message includes at least the following fields:

1) Type field being an option type field. Usually, "3" is taken as the value of the Type field to indicate that the option is a prefix information option.

2) Length field indicating a length of the prefix information option.

3) Prefix Length field indicating a prefix length.

4) L field indicating whether a prefix can be used for online detection.

5) A field indicating a stateless address auto-allocation marking. When the A field is set, that is, the stateless address auto-allocation marking is set to be valid, it indicates that the stateless address allocation mode is used to generate an IPv6 address.

6) R field configured to indicate whether a global unicast address of a network device is recorded in a Prefix field.

Where the Type field, Length field, Prefix Length field, L field, A field, and R field are standard fields in the RA message, and are not repeated herein again.

7) T field carrying indication information for indicating the IPv6 address lifetime refresh mode. The T field may occupy 1 bit and is used to characterize the lifetime refresh mode of an IPv6 address including the prefix, i.e., the prefix carried in the prefix information option of the RA message. Different indication information carried in the T field records different IPv6 address lifetime refresh modes.

For example, the T field carries fourth indication information. The fourth indication information indicates a first refresh mode. The first refresh mode includes: forcibly refreshing a lifetime of an IPv6 address including the prefix, that is, the prefix carried in the prefix information option of the RA message.

For example, the T field carries fifth indication information. The fifth indication information indicates a second refresh mode. The second refresh mode includes: refreshing a lifetime of an IPv6 address including the prefix, that is, the prefix carried in the prefix information option of the RA message, according to a default IPv6 address lifetime refresh mode of the host.

Where the fourth indication information may be represented by 1, and the fifth indication information may be represented by 0. Of course, the fourth indication information and the fifth indication information may also be represented by other numerals and symbols. Here, the fourth indication information and the fifth indication information are only exemplarily described, and are not particularly limited.

8) Mode field configured to indicate an address generation mode. The Mode field may occupy 3 bits. When the address generation mode includes a host interface identifier generation mode, the Mode field carries indication information for indicating the interface identifier generation mode. Different indication information carried in the Mode field characterizes different interface identifier generation modes.

For example, the Mode field carries first indication information. The first indication information indicates a first interface identifier generation mode. The first interface identifier generation mode includes: a Stable, Opaque Addresses Mode in RFC7217, i.e., generating a random number, and determining the generated random number as an interface identifier.

For example, the Mode field carries second indication information. The second indication information indicates a second interface identifier generation mode. The second interface identifier generation mode includes: a Cryptographically Generated Addresses (referred to as CGA) mode in [RFC3972], i.e., generating a random number, encrypting the generated random number, and determining the encrypted random number as an interface identifier.

For example, the Mode field carries third indication information. The third indication information indicates a third interface identifier generation mode. The third interface identifier generation mode includes: generating an interface identifier according to an interface identifier generation mode built in the host.

Where the first indication information may be represented by 001, the second indication information may be represented by 010, and the third indication information may be represented by 000. Of course, the first indication information, the second indication information, and the third indication information may also be represented by other representation manners such as numerals and symbols. Here, the first indication information, the second indication information, and the third indication information are only exemplarily described, and are not particularly limited.

9) Reserved1 field being a reserved field. The Reserved1 field in existing RA message occupies 5 bits. According to an example of the present disclosure, after using the Reserved1 field in the existing RA message to extend the T field and the Mode field, the Reserved1 field is reduced from 5 bits to 1 bit.

10) Valid Lifetime field being a field indicating a valid lifetime.

11) Preferred Lifetime field being a field indicating a preferred lifetime.

The Valid Lifetime field and the Preferred Lifetime field are also standard fields in the RA message, and are not repeated herein again.

12) Reserved2 field being a reserved field.

13) Prefix field configured to carry a prefix, and when the R field is set, to carry a global unicast IPv6 address of the network device.

After the RA message is introduced, the block 201 is described in detail below.

1. The timing for a network device sending an RA message to a host.

Mode 1:

The network device may send an RA message to the host periodically.

Mode 2:

The network device may also receive a Router Solicitation (referred to as RS) message sent by the host, and after receiving the RS message sent by the host, send a RA message to the host in response to the RS message.

Here, the timing for "a network device sending an RA message to a host" is only exemplarily described, and is not particularly limited.

2. The network device sends an RA message to the host.

The network device may send an RA message to the host after setting indication information carried in the Mode field and the T field in the RA message.

1) The network device sets the T field.

Mode 1: the network device may set the T field according to a pre-configured IPv6 address lifetime refresh mode.

During the implementation, the network device is pre-configured with an IPv6 address lifetime refresh mode. The network device may read the pre-configured IPv6 address lifetime refresh mode to set the T field. For example, if the IPv6 address lifetime refresh mode pre-configured on the network device is the first refresh mode described above, the network device may add the fourth indication information in the T field. If the IPv6 address lifetime refresh mode pre-configured on the network device is the second refresh mode described above, the network device may add the fifth indication information in the T field.

Mode 2: The network device may set the T field according to the relationship between a total number of existing IPv6 addresses of the host and a preset number threshold.

For example, the network device may send a detection packet to each host to obtain all existing IPv6 addresses of each host and generate an IPv6 address table. The IPv6 address table records the identifier of each host and all the existing IPv6 addresses of the host.

The network device may determine, from the IPv6 address table, a total number of existing IPv6 addresses of a host to which the RA message is to be sent.

If the total number of existing IPv6 addresses of the host exceeds a preset number threshold, the fourth indication information is carried in the T field.

If the total number of existing IPv6 addresses of the host does not exceed the preset number threshold, the fifth indication information is carried in the T field.

Mode 3: the network device may set the T field according to networking configuration.

During the implementation, the network device may read the networking configuration of a network where the network device is located, and set the indication information carried in the T field according to the networking configuration.

The setting method of the T field is only exemplarily described. Of course, other methods may also be used to set the T field, which is not particularly limited herein.

2) The network device sets the Mode field.

Mode 1: the Mode field is set according to a locally pre-configured interface identifier generation mode.

The network device is pre-configured with an interface identifier generation mode. The network device may read the pre-configured interface identifier generation mode, and then set the Mode field according to the read interface identifier generation mode.

For example, when the interface identifier generation mode pre-configured on the network device is the first interface identifier generation mode, the network device may add the first indication information in the Mode field.

When the interface identifier generation mode pre-configured on the network device is the second interface identifier generation mode, the network device may add the second indication information in the Mode field.

When the interface identifier generation mode pre-configured on the network device is the third interface identifier generation mode, the network device may add the third indication information in the Mode field.

Mode 2: the network device sets the Mode field according to networking configuration.

The network device is configured with networking configuration of a network where the network device is located.

The network device may read the networking configuration, determine an interface identifier generation mode adapted to the networking configuration, and set the Mode field according to the determined interface identifier generation mode.

For example, when the network where the network device is located is a highly secure network (for example, including networking configuration related to a security protocol), in order to ensure that private information of the host does not leak, the interface identifier generation mode adapted to the network is the second interface identifier generation mode, that is, generating a random number, encrypting the generated random number, and determining the encrypted random number as an interface identifier.

Therefore, when the networking configuration on the network device is related to the security protocol, the network device may add the second indication information in the Mode field.

For another example, when the network where the network device is located is an access control network, a host address sniffer and/or a host IPv6 address management and control network, the interface identifier generation mode adapted to the network is the first interface identifier generation mode, that is, generating a random number and determining the generated random number as an interface identifier.

Therefore, when the network device is configured with networking configuration related to "access control", and "host address sniffer and/or host IPv6 address management and control", the network device may add the first indication information in the Mode field.

For another example, when the network where the network device is located is an enterprise internal network or a campus network that does not require authentication, the interface identifier generation mode corresponding to this network is the third interface identifier generation mode, that is, generating an interface identifier according to an interface identifier generation mode built in the host.

Therefore, when the network device is configured with the networking configuration related to the enterprise internal network and the campus network that does not require authentication, the network device may add the third indication information in the Mode field.

Because the interface identifier generation mode indicated by the indication information carried in the Mode field is adapted to the networking configuration of the network where the network device is located, the IPv6 address generated by the host according to the interface identifier generation mode is more adaptable to the network where the network device is located.

In the above, the setting of the Mode field is only exemplarily described. Of course, the Mode field can also be set in any other way, which is not particularly limited herein.

In addition, it should be noted that:

when the A field in the prefix information option of the RA message is not set, the Mode field and the T field are not set, i.e., the values of the Mode field and the T field are set invalid or NULL.

If the network device cannot determine the IPv6 address lifetime refresh mode, the fifth indication information is carried in the T field. If the network device cannot determine the address generation mode, the third indication information is carried in the Mode field.

FIG. 4 is a schematic diagram illustrating an IPv6 stateless address auto-configuration method according to an example of the present disclosure. The method may be applied to a host, and include the following blocks.

At block 401, the host receives an RA message sent by a network device, wherein the RA message includes a prefix information option, and the prefix information option includes a prefix and a flag.

At block 402, the host performs IPv6 stateless address auto-configuration according to the prefix and the flag.

Therefore, an example of the present disclosure provides a new IPv6 stateless address auto-configuration method. Since the host may perform the IPv6 stateless address auto-configuration according to the prefix and flag in the prefix information option of the RA message, the mode for the host to perform the IPv6 stateless address auto-configuration is more flexible.

Hereinafter, "at block 401, the host receives an RA message sent by a network device" is described in detail.

In an implementation, the host may receive an RA message periodically sent by the network device.

In another implementation, the host may also send an RS message to the network device, and receive an RA message returned by the network device in response to the RS message.

Here, the timing for "the host receives an RA message sent by the network device" is only exemplarily described, and is not particularly limited.

Hereinafter, "at block 402, the host performs IPv6 stateless address auto-configuration according to the prefix and the flag" is described.

In an optional implementation, the flag is used to indicate an address generation mode and an IPv6 address lifetime refresh mode. The Mode field is used to indicate the address generation mode. The T field is used to indicate the IPv6 address lifetime refresh mode.

For the RA message, the prefix information option, the Mode field and the T field, reference may be made to the description in the block 201, and details thereof are not described herein again.

When the flag is used to indicate the address generation mode and the IPv6 address lifetime refresh mode, "the host performs IPv6 stateless address auto-configuration according to the prefix and the flag" may include at least two IPv6 stateless address auto-configuration modes. The two IPv6 stateless address auto-configuration modes are "generating an IPv6 address of the host according to the prefix and the address generation mode" and "refreshing an IPv6 address including the prefix according to the prefix and the IPv6 address lifetime refresh mode", respectively.

Hereinafter, two IPv6 stateless address auto-configuration modes are described in detail respectively.

1) The host generates an IPv6 address of the host according to the prefix and the address generation mode.

During the implementation, the address generation mode includes: a host interface identifier generation mode.

The host may generate an interface identifier of the host according to the address generation mode carried in the Mode field, and generate an IPv6 address of the host according to the interface identifier and the prefix carried in the prefix information option of the RA message.

When generating the interface identifier of the host according to the address generation mode carried in the Mode field, the host may read the Mode field.

If the Mode field carries first indication information, the host generates the interface identifier according to a first interface identifier generation mode indicated by the first indication information. The first interface identifier generation mode includes: generating a random number, and determining the generated random number as the interface identifier.

If the Mode field carries second indication information, the host generates the interface identifier according to a second interface identifier generation mode indicated by the second indication information. The second interface identifier generation mode includes: generating a random number, encrypting the generated random number, and determining the encrypted random number as the interface identifier.

If the Mode field carries third indication information, the host generates the interface identifier according to a third interface identifier generation mode indicated by the third indication information. The third interface identifier generation mode includes: generating the interface identifier according to an interface identifier generation mode built in the host.

2) The host refreshes the IPv6 address including the prefix according to the prefix and the IPv6 address lifetime refresh mode.

The host may read the T field in the prefix information option of the RA message.

If the T field carries fourth indication information, the host refreshes the lifetime of the IPv6 address including the prefix according to a first refresh mode indicated by the fourth indication information. The first refresh mode includes: forcibly refreshing the lifetime of the IPv6 address including the prefix.

If the T field carries fifth indication information, the host refreshes the lifetime of the IPv6 address including the prefix according to a second refresh mode indicated by the fifth indication information. The second refresh mode includes: refreshing the lifetime of the IPv6 address including the prefix according to a default IPv6 address lifetime refresh mode of the host.

Figure 5:
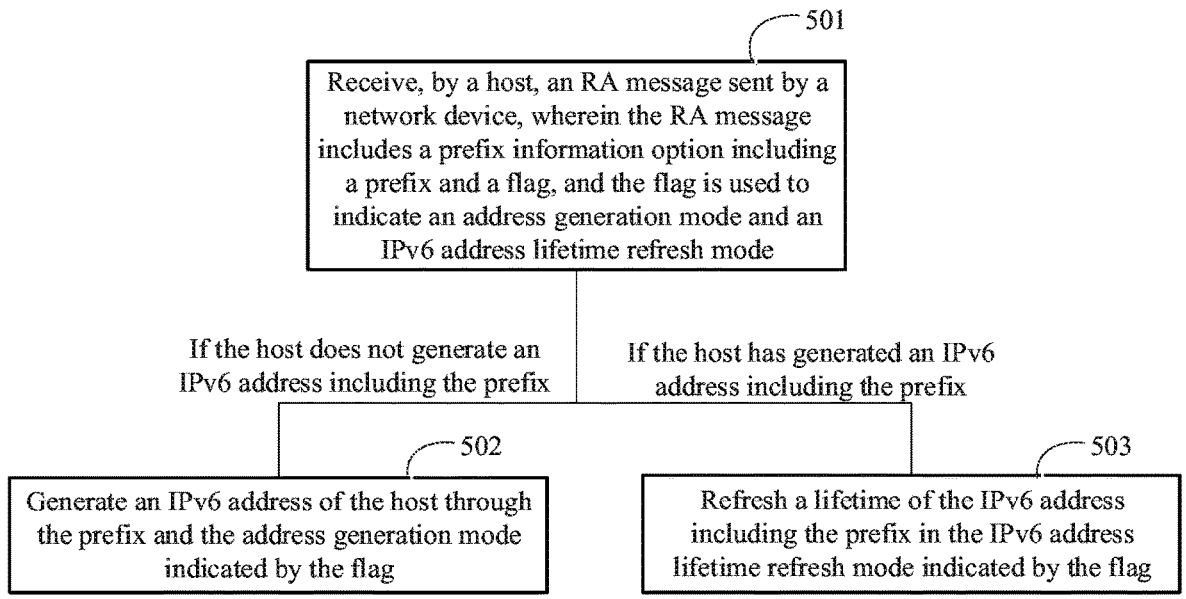
FIG. 5 is a flowchart illustrating another IPv6 stateless address auto-configuration method according to an example of the present disclosure.

In addition, in an optional implementation, the host may perform "generating an IPv6 address of the host according to the prefix and the address generation mode" and "refreshing an IPv6 address including the prefix according to the prefix and the IPv6 address lifetime refresh mode" in the manner shown in FIG. 5.

FIG. 5 is a flowchart illustrating another IPv6 stateless address auto-configuration method according to an example of the present disclosure.

At block 501, a host receives an RA message sent by a network device, wherein the RA message includes a prefix information option, and the prefix information option includes a prefix and a flag. The flag is used to indicate an address generation mode and an IPv6 address lifetime refresh mode.

At block 502, if the host does not generate an IPv6 address including the prefix, an IPv6 address of the host is generated according to the prefix and the address generation mode indicated by the flag.

At block 503, if the host has generated an IPv6 address including the prefix, a lifetime of the IPv6 address including the prefix is refreshed according to the IPv6 address lifetime refresh mode indicated by the flag.

As can be seen from FIG. 5, in a first aspect, the host does not generate an IPv6 address every time it receives an RA message, but generates the IPv6 address including the prefix when there is no such IPv6 address, and refreshes the IPv6 address including the prefix when there is such IPv6 address. The host does not need to generate the IPv6 address frequently, so that the workload of the host may be reduced.

In a second aspect, because the host performs IPv6 stateless address auto-configuration according to the prefix and flag in the prefix information option, the mode for the host to perform the IPv6 stateless address auto-configuration is more flexible.

In a third aspect, after determining that the IPv6 address including the prefix has been generated, the host may refresh the lifetime of the IPv6 address according to the IPv6 address lifetime refresh mode in the prefix information option, so that the mode for the host to refresh the lifetime of the IPv6 address is more flexible.

It should be noted that FIG. 5 only illustrates the execution logic of the two IPv6 stateless address auto-configuration modes by way of examples. The execution logic of the two IPv6 stateless address auto-configuration modes is not particularly limited herein.

It should also be noted that after the host receives the RA message sent by the network device, if the A field included in the prefix information option of the RA message is not set, the Mode field and the T field in the prefix information option are skipped.

Where "the Mode field and the T field in the prefix information option are skipped" means that the Mode field and the T field in the prefix information option are not read.

If the prefix in the prefix information option of the RA message is a local link prefix, the Mode field and the T field in the prefix information option are skipped.

If the host does not support generating an IPv6 address according to the address generation mode carried by the flag in the prefix information option, the Mode field included in the prefix information option is skipped.

Figure 6:
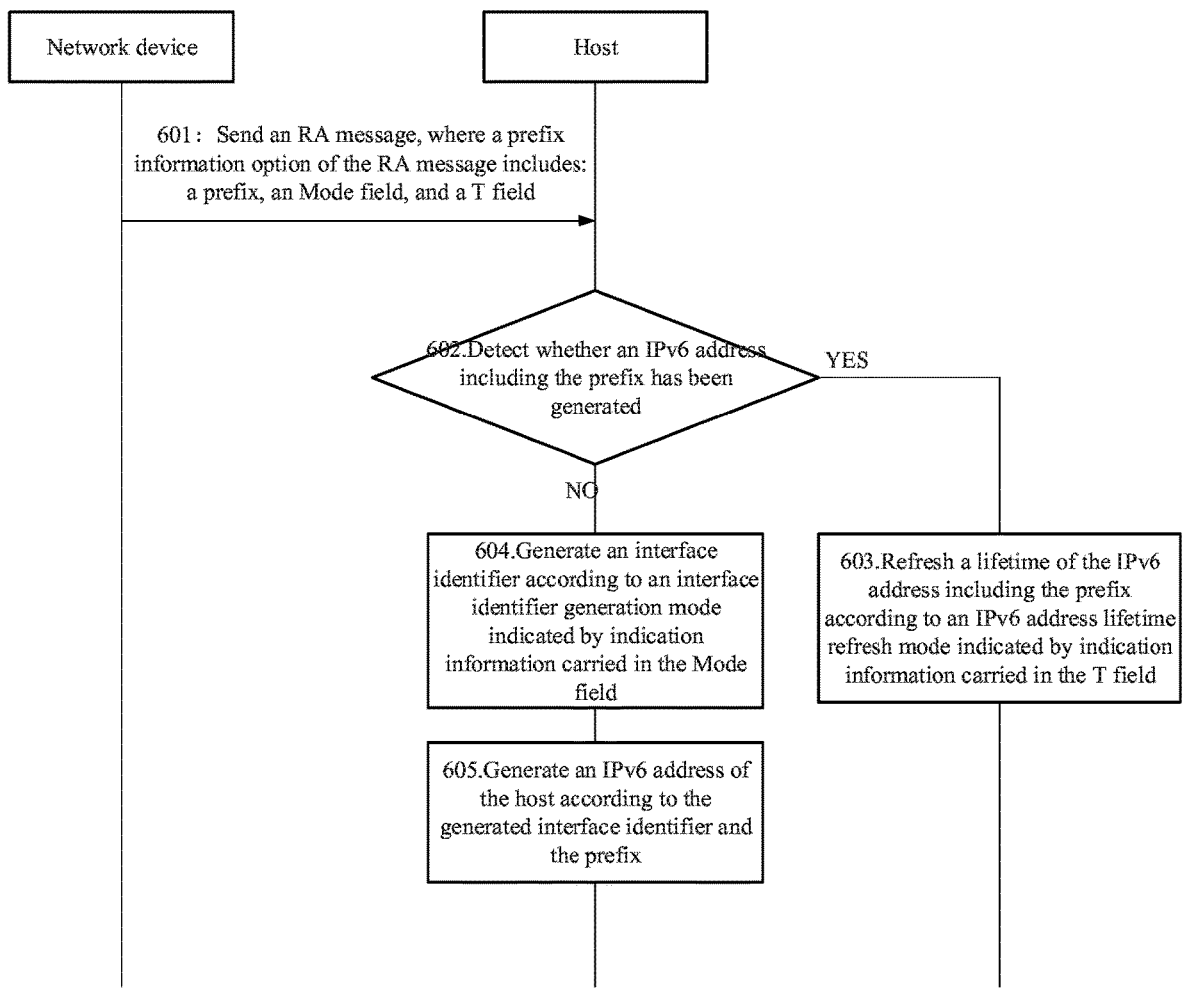
FIG. 6 is a flowchart illustrating another IPv6 stateless address auto-configuration method according to an example of the present disclosure.

FIG. 6 is a schematic diagram illustrating an IPv6 stateless address auto-configuration method according to an example of the present disclosure. The method may include the following blocks.

At block 601, a network device sends an RA message to a host. A prefix information option of the RA message includes: a prefix, a Mode field, and a T field.

For detail, reference may be made to the description in the block 201, which will not be described herein again.

At block 602, the host may detect whether an IPv6 address including the prefix has been generated.

If the host has generated the IPv6 address including the prefix, block 603 is performed.

If the host does not generate the IPv6 address including the prefix, blocks 604 to 605 are performed.

At block 603, if the host has generated the IPv6 address including the prefix, a lifetime of the IPv6 address including the prefix is refreshed according to an IPv6 address lifetime refresh mode indicated by indication information carried in the T field.

For detail, reference may be made to the description in the block 402, which will not be described herein again.

At block 604, if the host does not generate the IPv6 address including the prefix, an interface identifier is generated according to an interface identifier generation mode indicated by indication information carried in the Mode field.

For detail, reference may be made to the description in the block 402, which will not be described herein again.

At block 605, the host generates an IPv6 address of the host according to the generated interface identifier and the prefix.

As can be known from the above description, in a first aspect, because the IPv6 stateless address auto-configuration is performed according to the prefix and flag set by the network device, the mode for the host to perform the IPv6 stateless address auto-configuration is more flexible.

In a second aspect, the host may refresh the lifetime of the IPv6 address according to the IPv6 address lifetime refresh mode included in the prefix information option, so that the mode for the host to refresh the lifetime of the IPv6 address is more flexible.

In a third aspect, since the interface identifier generation mode carried in the Mode field and the IPv6 address lifetime refresh mode carried in the T field are adapted to the networking configuration of the network where the network device is located, the IPv6 address generated by the host according to the interface identifier generation mode and the mode for the host to refresh the lifetime of the IPv6 address are better adapted to the network where the network device is located.

In a fourth aspect, the host no longer generates the IPv6 address frequently, but generates the IPv6 address including the prefix when there is no such IPv6 address and refreshes the lifetime of the IPv6 address including the prefix when there is such IPv6 address. The host does not need to generate the IPv6 address frequently, so that the workload of the host may be reduced.

An example of the present disclosure further provides an IPv6 stateless address auto-configuration apparatus corresponding to the IPv6 stateless address auto-configuration method as described above. The IPv6 stateless address auto-configuration apparatus is described in detail below.

Figure 7:
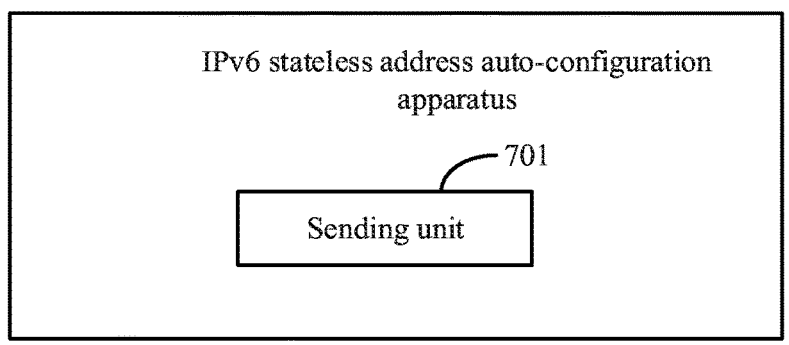
FIG. 7 is a block diagram illustrating an IPv6 stateless address auto-configuration apparatus according to an example of the present disclosure.

FIG. 7 is a block diagram illustrating an IPv6 stateless address auto-configuration apparatus according to an example of the present disclosure. The apparatus may be applied to a network device, and include a sending unit 701.

The sending unit 701 is configured to send a router advertisement RA message to a host, wherein the RA message includes a prefix information option, the prefix information option includes a prefix and a flag, and the prefix and the flag are used for IPv6 stateless address auto-configuration.

In one example, the flag is configured to indicate an address generation mode and an IPv6 address lifetime refresh mode;

the IPv6 stateless address auto-configuration includes: generating an IPv6 address of the host; or refreshing a lifetime of the IPv6 address of the host.

In one example, the flag includes a Mode field and a T field;

the Mode field is configured to indicate the address generation mode, and the T field is configured to indicate the IPv6 address lifetime refresh mode.

In one example, the Mode field and the T field occupy four bits in a reserved field included in the prefix information option;

where three consecutive bits of the four bits are occupied by the Mode field, and one bit is occupied by the T field.

In one example, the address generation mode includes a mode in which the host generates an interface identifier of the host.

In one example, the address generation mode is set according to an interface identifier generation mode pre-configured locally by the network device, or according to networking configuration of the network device.

In one example, the Mode field carries first indication information indicating a first interface identifier generation mode, wherein the first interface identifier generation mode includes: generating a random number, and determining the generated random number as the interface identifier of the host; or the Mode field carries second indication information indicating a second interface identifier generation mode, wherein the second interface identifier generation mode includes: generating a random number, encrypting the generated random number, and determining the encrypted random number as the interface identifier of the host; or the Mode field carries third indication information indicating a third interface identifier generation mode, wherein the third interface identifier generation mode includes: generating the interface identifier of the host according to an interface identifier generation mode built in the host.

In one example, the IPv6 address lifetime refresh mode is set according to an IPv6 address lifetime refresh mode pre-configured by the network device, or according to a total number of existing IPv6 addresses of the host and a preset number threshold, or according to networking configuration of the network device.

In one example, the T field carries fourth indication information indicating a first refresh mode, wherein the first refresh mode includes: forcibly refreshing a lifetime of an IPv6 address including the prefix; or the T field carries fifth indication information indicating a second refresh mode, wherein the second refresh mode includes: refreshing a lifetime of an IPv6 address including the prefix according to a default IPv6 address lifetime refresh mode of the host.

In one example, when the total number of the IPv6 addresses exceeds the preset number threshold, the T field carries the fourth indication information;

when the total number of the IPv6 addresses does not exceed the preset number threshold, the T field carries the fifth indication information.

In one example, the prefix information option further includes an A field for indicating a stateless address auto-allocation marking;

the sending unit 701 is further configured, if the stateless address auto-allocation marking is set to be invalid, not to set the Mode field and the T field.

In one example, the sending unit 701 is specifically configured to send an RA message to the host periodically; or after receiving a router solicitation RS message sent by the host, send an RA message to the host in response to the RS message.

Figure 8:
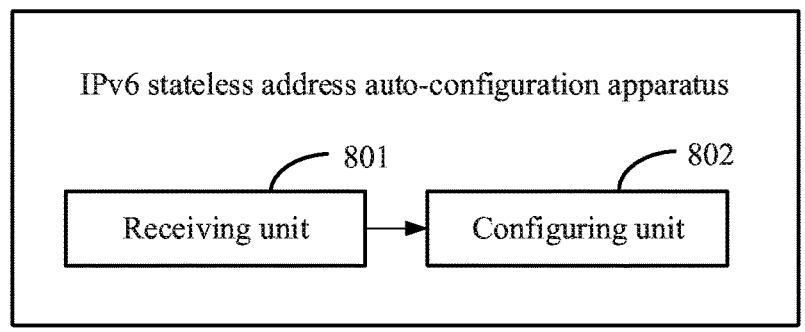
FIG. 8 is a block diagram illustrating another IPv6 stateless address auto-configuration apparatus according to an example of the present disclosure.

FIG. 8 is a block diagram illustrating another IPv6 stateless address auto-configuration apparatus according to an example of the present disclosure. The apparatus may be applied to a host, and include the following units:

a receiving unit 801 configured to receive a router advertisement RA message sent by a network device, wherein the RA message includes a prefix information option, and the prefix information option includes a prefix and a flag; and a configuring unit 802 configured to perform IPv6 stateless address auto-configuration according to the prefix and the flag.

In one example, the flag is configured to indicate an address generation mode and an IPv6 address lifetime refresh mode;

the configuring unit 802 is specifically configured to generate an IPv6 address of the host according to the prefix and the address generation mode; or refresh a lifetime of an IPv6 address including the prefix according to the prefix and the IPv6 address lifetime refresh mode.

In one example, the flag includes an Mode field and a T field;

the Mode field is configured to indicate the address generation mode, and the T field is configured to indicate the IPv6 address lifetime refresh mode.

In an example, the address generation mode includes: a mode for the host to generate the interface identifier;

the configuring unit 802, when generating the IPv6 address of the host according to the prefix and the address generation mode, is specifically configured to generate an interface identifier of the host according to the address generation mode carried in the Mode field; and generate the IPv6 address of the host according to the prefix and the generated interface identifier.

In one example, the configuring unit 802, when generating the interface identifier of the host according to the address generation mode carried in the Mode field, is specifically configured to, if the Mode field carries first indication information, generate the interface identifier of the host according to a first interface identifier generation mode indicated by the first indication information, wherein the first interface identifier generation mode includes: generating a random number, and determining the generated random number as the interface identifier of the host;

if the Mode field carries second indication information, generate the interface identifier of the host according to a second interface identifier generation mode indicated by the second indication information, wherein the second interface identifier generation mode includes: generating a random number, encrypting the generated random number, and determining the encrypted random number as the interface identifier of the host; and if the Mode field carries third indication information, generate the interface identifier of the host according to a third interface identifier generation mode indicated by the third indication information, wherein the third interface identifier generation mode includes: generating the interface identifier of the host according to an interface identifier generation mode built in the host.

In one example, the configuring unit 802, when refreshing the lifetime of the IPv6 address including the prefix according to the prefix and the IPv6 address lifetime refresh mode, is specifically configured to, if the T field carries fourth indication information, refresh the lifetime of the IPv6 address including the prefix according to a first refresh mode indicated by the fourth indication information, wherein the first refresh mode includes: forcibly refreshing the lifetime of the IPv6 address including the prefix;

if the T field carries fifth indication information, refresh the lifetime of the IPv6 address including the prefix according to a second refresh mode indicated by the fifth indication information, wherein the second refresh mode includes: refreshing the lifetime of the IPv6 address including the prefix according to a default IPv6 address lifetime refresh mode of the host.

In one example, the configuring unit 802 is further configured to, if the host generates the IPv6 address including the prefix, refresh the lifetime of the IPv6 address including the prefix according to the prefix and the IPv6 address lifetime refresh mode; and if the host does not generate the IPv6 address including the prefix, generate the IPv6 address of the host according to the prefix and the address generation mode.

In one example, the prefix information option further includes: an A field for indicating a stateless address auto-allocation marking;

the configuring unit 802 is further configured to, if the stateless address auto-allocation marking is set to be invalid, skip the Mode field and the T field; if the prefix is a local link prefix, skip the Mode field and the T field.

In one example, the receiving unit 801 is specifically configured to, send a router solicitation RS message to the network device, and receive an RA message returned by the network device in response to the RS message; or, receive an RA message sent by the network device periodically.

In addition, an example of the present disclosure further provides a network device.

Figure 9:
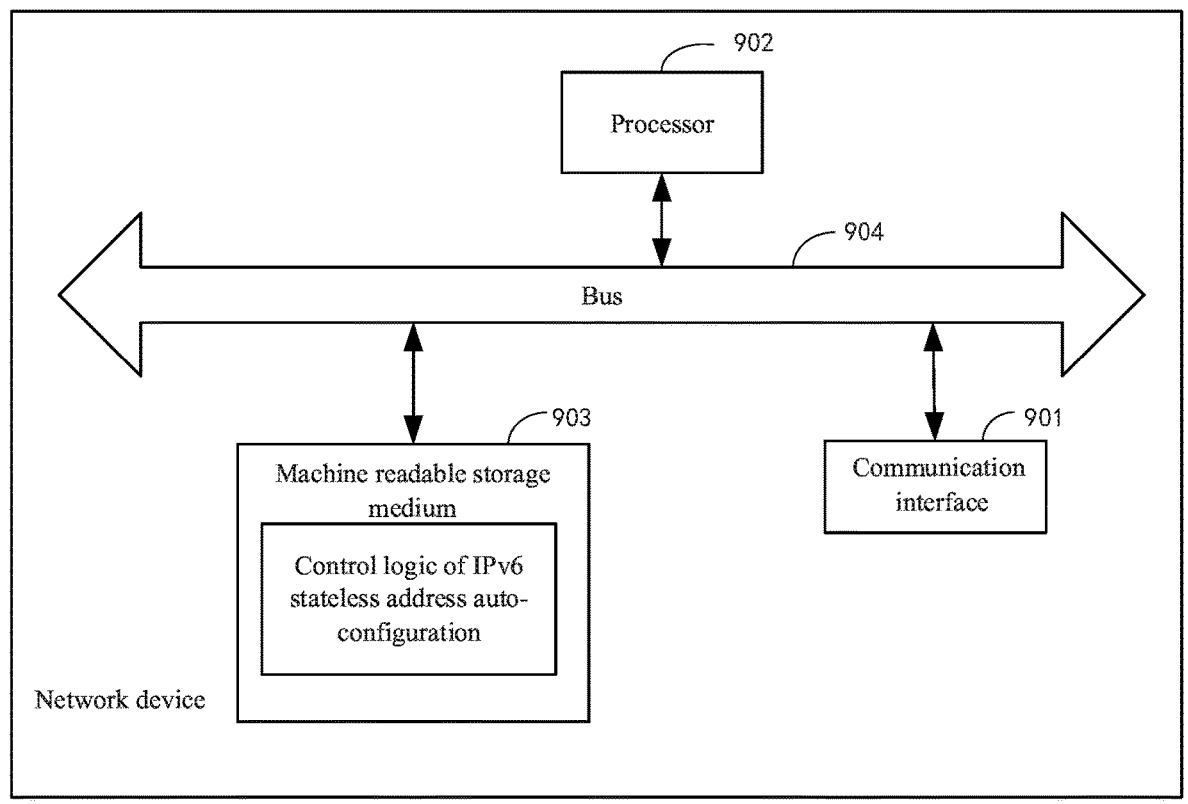
FIG. 9 is a hardware structural diagram illustrating a network device according to an example of the present disclosure.

FIG. 9 is a hardware structural diagram illustrating a network device according to an example of the present disclosure.

The network device includes: a communication interface 901, a processor 902, a machine readable storage medium 903, and a bus 904, wherein the communication interface 901, the processor 902, and the machine readable storage medium 903 complete communication with each other through the bus 904. The processor 902 may execute the IPv6 stateless address auto-configuration method described above by reading and executing machine executable instructions corresponding to the control logic of IPv6 stateless address auto-configuration in the machine readable storage medium 903. The processor 902 may be a single CPU or a combination of hardware processing components such as a CPU, a simple circuit, and a gate, and has not only a data processing function, but also other functions such as data communication with an external device. The implementation of the processor 902 is not limited by the present disclosure.

The machine readable storage medium 903 mentioned herein may be any electronic, magnetic, optical, or other physical storage apparatus, and may contain or store information such as executable instructions, and data. For example, the machine readable storage medium may be: a volatile memory, a non-volatile memory, or a similar storage medium. Specifically, the machine readable storage medium 903 may be a RAM (Radom Access Memory), a flash memory, a storage drive such as a hard disk drive, a solid state hard disk, any type of storage disk such as an optical disk and a DVD, or similar storage media, or a combination thereof.

The processor 902 is caused by the machine executable instructions to:

send a router advertisement RA message to a host, wherein the RA message includes a prefix information option, the prefix information option includes a prefix and a flag, and the prefix and the flag are used for IPv6 stateless address auto-configuration.

In one example, the flag is configured to indicate an address generation mode and an IPv6 address lifetime refresh mode;

the IPv6 stateless address auto-configuration includes: generating an IPv6 address of the host; or refreshing a lifetime of the IPv6 address of the host.

In one example, the flag includes an Mode field and a T field;

the Mode field is configured to indicate the address generation mode, and the T field is configured to indicate the IPv6 address lifetime refresh mode.

In one example, the Mode field and the T field occupy four bits in a reserved field included in the prefix information option;

where three consecutive bits of the four bits are occupied by the Mode field, and one bit is occupied by the T field.

In one example, the address generation mode includes a mode in which the host generates an interface identifier of the host.

In one example, the address generation mode is set according to an interface identifier generation mode pre-configured locally by the network device, or according to networking configuration of the network device.

In one example, the Mode field carries any of the following information:

first indication information indicating a first interface identifier generation mode, wherein the first interface identifier generation mode includes: generating a random number, and determining the generated random number as the interface identifier of the host;

second indication information indicating a second interface identifier generation mode, wherein the second interface identifier generation mode includes: generating a random number, encrypting the generated random number, and determining the encrypted random number as an interface identifier; or third indication information indicating a third interface identifier generation mode, wherein the third interface identifier generation mode includes: generating the interface identifier of the host according to an interface identifier generation mode built in the host.

In one example, the IPv6 address lifetime refresh mode is set according to an IPv6 address lifetime refresh mode pre-configured by the network device, or according to a total number of existing IPv6 addresses of the host and a preset number threshold, or according to networking configuration of the network device.

In one example, the T field carries any of the following information:

fourth indication information indicating a first refresh mode, wherein the first refresh mode includes: forcibly refreshing a lifetime of an IPv6 address including the prefix; and fifth indication information indicating a second refresh mode, wherein the second refresh mode includes: refreshing a lifetime of an IPv6 address including the prefix according to a default IPv6 address lifetime refresh mode of the host.

In one example, when the total number of IPv6 addresses exceeds the preset number threshold, the T field carries the fourth indication information;

when the total number of the IPv6 addresses does not exceed the preset number threshold, the T field carries the fifth indication information.

In one example, the prefix information option further includes an A field for indicating a stateless address auto-allocation marking; the processor 902 is caused by the machine executable instructions to perform the following operation:

if the stateless address auto-allocation marking is set to be invalid, not setting the Mode field and the T field.

In one example, when sending the router advertisement RA message to the host, the processor 902 is caused by the machine executable instructions to perform the following operation:

sending an RA message to the host periodically; or after receiving a router solicitation RS message sent by the host, sending an RA message to the host in response to the RS message.

In addition, an example of the present disclosure further provides a host.

Figure 10:
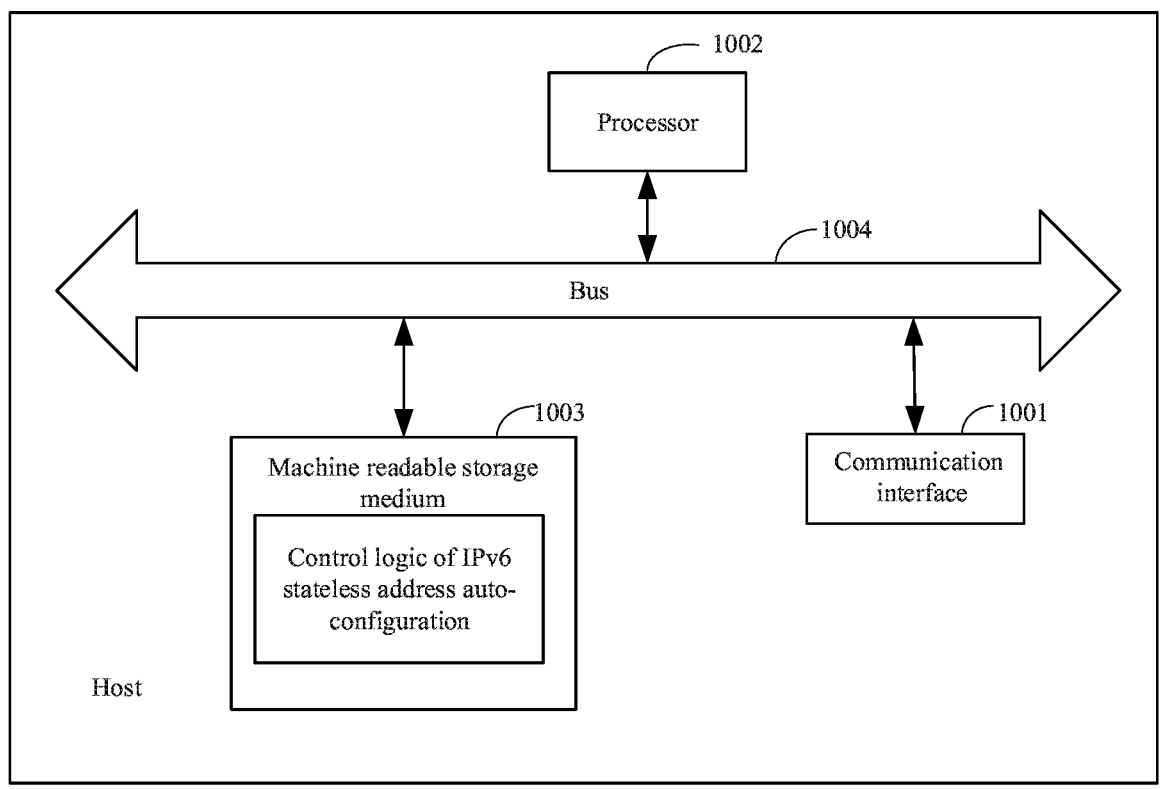
FIG. 10 is a hardware structural diagram illustrating a host according to an example of the present disclosure.

FIG. 10 is a hardware structural diagram illustrating a host according to an example of the present disclosure.

The host includes: a communication interface 1001, a processor 1002, a machine readable storage medium 1003, and a bus 1004, wherein the communication interface 1001, the processor 1002, and the machine readable storage medium 1003 complete communication with each other through a bus 1004. The processor 1002 may execute the IPv6 stateless address auto-configuration method described above by reading and executing machine executable instructions corresponding to the control logic of IPv6 stateless address auto-configuration in the machine readable storage medium 1003.

The machine readable storage medium 1003 mentioned herein may be any electronic, magnetic, optical, or other physical storage apparatus, and may contain or store information such as executable instructions, and data. For example, the machine readable storage medium may be: a volatile memory, a non-volatile memory, or a similar storage medium. Specifically, the machine readable storage medium 1003 may be a RAM (Radom Access Memory), a flash memory, a storage drive such as a hard disk drive, a solid state hard disk, any type of storage disk such as an optical disk and a DVD, or similar storage media, or a combination thereof.

The processor 1002 is caused by the machine executable instructions to perform the following operations:

receiving a router advertisement RA message sent by a network device, wherein the RA message includes a prefix information option, and the prefix information option includes a prefix and a flag; and performing IPv6 stateless address auto-configuration according to the prefix and the flag.

In one example, the flag is configured to indicate an address generation mode and an IPv6 address lifetime refresh mode;

performing the IPv6 stateless address auto-configuration according to the prefix and the flag includes:

generating an IPv6 address of the host according to the prefix and the address generation mode; or refreshing a lifetime of an IPv6 address including the prefix according to the prefix and the IPv6 address lifetime refresh mode.

In one example, the flag includes an Mode field and a T field;

the Mode field is configured to indicate the address generation mode, and the T field is configured to indicate the IPv6 address lifetime refresh mode.

In one example, the address generation mode includes: a mode in which the host generates the interface identifier of the host;

generating the IPv6 address of the host according to the prefix and the address generation mode includes:

generating an interface identifier of the host according to the address generation mode carried in the Mode field; and generating the IPv6 address of the host according to the prefix and the generated interface identifier.

In one example, when generating the interface identifier of the host according to the address generation mode carried in the Mode field, the processor 1002 is caused by the machine executable instructions to perform the following operations:

if the Mode field carries first indication information, generating the interface identifier of the host according to a first interface identifier generation mode indicated by the first indication information, wherein the first interface identifier generation mode includes: generating a random number, and determining the generated random number as the interface identifier of the host;

if the Mode field carries second indication information, generating the interface identifier of the host according to a second interface identifier generation mode indicated by the second indication information, wherein the second interface identifier generation mode includes: generating a random number, encrypting the generated random number, and determining the encrypted random number as the interface identifier of the host; and if the Mode field carries third indication information, generating the interface identifier of the host according to a third interface identifier generation mode indicated by the third indication information, wherein the third interface identifier generation mode includes: generating the interface identifier of the host according to an interface identifier generation mode built in the host.

In one example, when refreshing the lifetime of the IPv6 address including the prefix according to the prefix and the IPv6 address lifetime refresh mode, the processor 1002 is caused by the machine executable instructions to perform the following operations:

if the T field carries fourth indication information, refreshing the lifetime of the IPv6 address including the prefix according to a first refresh mode indicated by the fourth indication information, wherein the first refresh mode includes: forcibly refreshing the lifetime of the IPv6 address including the prefix;

if the T field carries fifth indication information, refreshing the lifetime of the IPv6 address including the prefix according to a second refresh mode indicated by the fifth indication information, wherein the second refresh mode includes: refreshing the lifetime of the IPv6 address including the prefix according to a default IPv6 address lifetime refresh mode of the host.

In one example, before performing the IPv6 stateless address auto-configuration according to the prefix and the flag, the processor 1002 is caused by the machine executable instructions to perform the following operations:

if the host generates the IPv6 address including the prefix, refreshing the lifetime of the IPv6 address including the prefix according to the prefix and the IPv6 address lifetime refresh mode; and if the host does not generate the IPv6 address including the prefix, generating the IPv6 address of the host according to the prefix and the address generation mode.

In one example, the prefix information option further includes: an A field for indicating a stateless address auto-allocation marking; the processor 1002 is caused by the machine executable instructions to perform the following operations:

if the stateless address auto-allocation marking is set to be invalid, skipping the Mode field and the T field;

if the prefix is a local link prefix, skipping the Mode field and the T field.

In one example, when receiving the router advertisement RA message sent by the network device, the processor 1002 is caused by the machine executable instructions to perform the following operations:

sending a router solicitation RS message to the network device, and receiving an RA message returned by the network device in response to the RS message; or, receiving an RA message periodically sent by the network device.

For details about the implementation of functions and roles of each unit in the apparatuses, reference may be made to the implementation of corresponding blocks in the methods, which is not described herein again.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

The above are only the preferred examples of the present disclosure, which are not intended to limit the disclosure. Any modification, equivalent replacement, or improvement made within the spirit and principles of the disclosure shall be included within the scope of the disclosure.

The invention claimed is:

1. A method of performing Internet Protocol Version 6 IPv6 stateless address auto-configuration, applied to a network device and comprising:

sending a router advertisement RA message to a host, wherein the RA message comprises a prefix information, the prefix information comprises a prefix and a flag, and the prefix and the flag are used for IPv6 stateless address auto-configuration, wherein the flag is configured to indicate an address generation mode used to guide the host to generate an IPv6 address of the host and an IPv6 address lifetime refresh mode used to guide the host to refresh a lifetime of an IPv6 address that has been generated by the host;
the IPv6 stateless address auto-configuration comprises:
generating an IPv6 address of the host, or refreshing a lifetime of the IPv6 address of the host,
wherein the flag comprises a first field and a second field;
the first field is configured to indicate the address generation mode;
the second field is configured to indicate the IPv6 address lifetime refresh mode,
wherein the first field and the second field occupy four bits in a reserved field comprised in the prefix information;
wherein, three consecutive bits of the four bits are occupied by the first field, and one bit is occupied by the second field.

2. The method according to claim 1, wherein the address generation mode comprises a mode in which the host generates an interface identifier of the host,
wherein the address generation mode is set according to an interface identifier generation mode pre-configured locally by the network device, or according to networking configuration of the network device.

3. The method according to claim 2, wherein the first field carries any of the following information:
first indication information indicating a first interface identifier generation mode, wherein the first interface identifier generation mode comprises: generating a random number, and determining the generated random number as the interface identifier of the host;
second indication information indicating a second interface identifier generation mode, wherein the second interface identifier generation mode comprises: generating a random number, encrypting the generated random number, and determining the encrypted random number as the interface identifier of the host; and
third indication information indicating a third interface identifier generation mode, wherein the third interface identifier generation mode comprises: generating the interface identifier of the host according to an interface identifier generation mode built in the host.

4. The method according to claim 1, wherein the IPv6 address lifetime refresh mode is set according to an IPv6 address lifetime refresh mode pre-configured by the network device, or according to a total number of existing IPv6 addresses of the host and a preset number threshold, or according to networking configuration of the network device.

5. The method according to claim 4, wherein the second field carries any of the following information:
fourth indication information indicating a first refresh mode, wherein the first refresh mode comprises: forcibly refreshing a lifetime of an IPv6 address comprising the prefix; and
fifth indication information indicating a second refresh mode, wherein the second refresh mode comprises: refreshing a lifetime of an IPv6 address comprising the prefix according to a default IPv6 address lifetime refresh mode of the host.

6. The method according to claim 5, wherein when the total number of the IPv6 addresses exceeds the preset number threshold, the second field carries the fourth indication information;
when the total number of the IPv6 addresses does not exceed the preset number threshold, the second field carries the fifth indication information.

7. The method according to claim 1, wherein the prefix information further comprises an A field for indicating a stateless address auto-allocation marking;
the method further comprises:
if the stateless address auto-allocation marking is set to be invalid, not setting the first field and the second field.

8. The method according to claim 1, wherein sending the router advertisement RA message to the host comprises:
sending an RA message to the host periodically, or
after receiving a router solicitation RS message sent by the host, sending an RA message to the host in response to the RS message.

9. A method of performing Internet Protocol Version 6 IPv6 stateless address auto-configuration, applied to a host and comprising:
receiving a router advertisement RA message sent by a network device, wherein the RA message comprises a prefix information, and the prefix information comprises a prefix and a flag; and
performing IPv6 stateless address auto-configuration according to the prefix and the flag,
wherein the flag is configured to indicate an address generation mode used to guide the host to generate an IPv6 address of the host and an IPv6 address lifetime refresh mode used to guide the host to refresh a lifetime of an IPv6 address that has been generated by the host;
performing the IPv6 stateless address auto-configuration according to the prefix and the flag comprises:
generating an IPv6 address of the host according to the prefix and the address generation mode, or
refreshing a lifetime of an IPv6 address comprising the prefix according to the prefix and the IPv6 address lifetime refresh mode,
wherein the flag comprises a first field and a second field;
the first field is configured to indicate the address generation mode, and the second field is configured to indicate the IPv6 address lifetime refresh mode,
wherein the address generation mode comprises: a mode in which the host generates the interface identifier of the host;
generating the IPv6 address of the host according to the prefix and the address generation mode comprises:
generating an interface identifier of the host according to the address generation mode carried in the first field; and
generating the IPv6 address of the host according to the prefix and the generated interface identifier.

10. The method according to claim 9, wherein generating the interface identifier of the host according to the address generation mode carried in the first field comprises:
if the first field carries first indication information, generating the interface identifier of the host according to a first interface identifier generation mode indicated by the first indication information, wherein the first interface identifier generation mode comprises: generating a random number, and determining the generated random number as the interface identifier of the host;
if the first field carries second indication information, generating the interface identifier of the host according to a second interface identifier generation mode indicated by the second indication information, wherein the second interface identifier generation mode comprises: generating a random number, encrypting the generated random number, and determining the encrypted random number as the interface identifier of the host; and
if the first field carries third indication information, generating the interface identifier of the host according to a third interface identifier generation mode indicated by the third indication information, wherein the third interface identifier generation mode comprises: generating the interface identifier of the host according to an interface identifier generation mode built in the host.

11. The method according to claim 9, wherein refreshing the lifetime of the IPv6 address comprising the prefix according to the prefix and the IPv6 address lifetime refresh mode comprises:
   if the second field carries fourth indication information, refreshing the lifetime of the IPv6 address comprising the prefix according to a first refresh mode indicated by the fourth indication information, wherein the first refresh mode comprises: forcibly refreshing the lifetime of the IPv6 address comprising the prefix;
   if the second field carries fifth indication information, refreshing the lifetime of the IPv6 address comprising the prefix according to a second refresh mode indicated by the fifth indication information, wherein the second refresh mode comprises: refreshing the lifetime of the IPv6 address comprising the prefix according to a default IPv6 address lifetime refresh mode of the host.

12. The method according to claim 9, wherein before performing the IPv6 stateless address auto-configuration according to the prefix and the flag, the method further comprises: if the host generates the IPv6 address comprising the prefix, refreshing the lifetime of the IPv6 address comprising the prefix according to the prefix and the IPv6 address lifetime refresh mode; and if the host does not generate the IPv6 address comprising the prefix, generating the IPv6 address of the host according to the prefix and the address generation mode.

13. The method according to claim 9, wherein the prefix information further comprises: an A field for indicating a stateless address auto-allocation marking;
   the method further comprises:
   if the stateless address auto-allocation marking is set to be invalid, skipping the first field and the second field;
   if the prefix is a local link prefix, skipping the first field and the second field.

14. The method according to claim 9, wherein receiving the router advertisement RA message sent by the network device comprises:
   sending a router solicitation RS message to the network device, and receiving an RA message returned by the network device in response to the RS message, or,
   receiving an RA message periodically sent by the network device.

15. A network device, comprising a processor and a machine readable storage medium, wherein the machine readable storage medium stores machine executable instructions executable by the processor, and the processor is caused by the machine executable instructions to perform the method according to claim 1.

16. A host, comprising a processor and a machine readable storage medium, wherein the machine readable storage medium stores machine executable instructions executable by the processor, and the processor is caused by the machine executable instructions to perform the method according to claim 9.

* * * * *